(12) United States Patent
Xia et al.

(10) Patent No.: US 8,879,186 B1
(45) Date of Patent: Nov. 4, 2014

(54) FAST FLAW SCAN FOR MULTIPLE SENSOR SYSTEMS

(71) Applicant: LSI Technologies Inc., Allentown, PA (US)

(72) Inventors: Haitao Xia, Andover, MA (US); William J. Ledden, Erie, CO (US); Richard Rauschmayer, Longmont, CO (US); Ming Jin, Fremont, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/463,163

(22) Filed: Aug. 19, 2014

(51) Int. Cl.
  G11B 5/09 (2006.01)
  G11B 27/36 (2006.01)
  G11B 20/18 (2006.01)

(52) U.S. Cl.
  CPC ................................. G11B 20/182 (2013.01)
  USPC .................... 360/53; 360/31; 360/46; 360/75

(58) Field of Classification Search
  CPC .................. G11B 20/10027; G11B 20/10037; G11B 20/14; G11B 20/10222; G11B 2020/1232; G11B 2220/2516; G11B 20/1403; G11B 5/5965; G11B 5/012; G11B 27/36; G11B 2220/20
  USPC ........... 360/39, 40, 51, 25, 26, 31, 77.02, 53, 360/46, 67, 75
  See application file for complete search history.

(56) References Cited

U.S. PATENT DOCUMENTS

| | | | |
|---|---|---|---|
| 6,292,317 B1 | 9/2001 | Alexander | |
| 8,325,433 B2 * | 12/2012 | Zhang et al. | ..................... 360/39 |
| 8,780,476 B2 * | 7/2014 | Grundvig | ......................... 360/51 |
| 2012/0154947 A1 | 6/2012 | Cho et al. | |

* cited by examiner

Primary Examiner — Ali Neyzari
(74) Attorney, Agent, or Firm — Suiter Swantz pc llo

(57) ABSTRACT

A method for performing parallel flaw scans of a plurality of tracks of a storage device. The storage device includes at least one disk, at least two read sensors, at least two analog front ends, and at least two independent timing loops. Each disk includes at least one surface, wherein each surface includes a plurality of tracks. The method includes writing flaw patterns to tracks of one or more surfaces of one or more disks. The method also includes positioning a first read sensor to read a first track. The method further includes positioning a second read sensor to read a second track. The method additionally includes simultaneously reading signals from the first track and the second track. The method also includes simultaneously performing flaw scans on read back signals from the first track and the second track. The method further includes outputting flaw scan results.

20 Claims, 5 Drawing Sheets

FAST FLAW SCAN FOR MULTIPLE SENSOR SYSTEMS

FIELD OF THE INVENTION

Embodiments of the invention are directed generally toward a method, circuit, apparatus, and system for performing parallel flaw scans in multi-sensor systems.

BACKGROUND

In current hard disk drive manufacturing, flaw scan performance is a key step to identify media defects on a disk surface. During flaw scan, either a preamble pattern or preamble-like data with a low-density parity check (LDPC) encoded sequence is written on a disk. Then flaw scan circuit will do signal processing to read back signal and search for media defects. The flaw scan procedure can take up to several hours to complete per drive due to the large amount of tracks in one disk. For example, more than 50% of a drive's total manufacturing time is associated with performance of flaw scan procedures. As such, reducing the flaw scan time, which would in turn reduce cost, is currently a challenge for drive manufacturing companies. Therefore, it would be desirable to provide a method and system configured to reduce the amount of time required to perform flaw scan.

SUMMARY

Accordingly, an embodiment includes a method for performing parallel flaw scans of a plurality of tracks of a storage device. The storage device includes at least one disk, at least two read sensors, at least two analog front ends, and at least two independent timing loops. Each disk includes at least one surface, wherein each surface includes a plurality of tracks. The method includes writing flaw patterns to tracks of one or more surfaces of one or more disks. The method also includes positioning a first read sensor to read a first track. The method further includes positioning a second read sensor to read a second track. The method additionally includes simultaneously reading signals from the first track and the second track. The method also includes simultaneously performing flaw scans on read back signals from the first track and the second track. The method further includes outputting flaw scan results to a controller.

Additional embodiments are described in the application including the claims. It is to be understood that both the foregoing general description and the following detailed description are exemplary and explanatory only and are not restrictive. Other embodiments of the invention will become apparent.

BRIEF DESCRIPTION OF THE FIGURES

Other embodiments of the invention will become apparent by reference to the accompanying figures in which.

DETAILED DESCRIPTION OF THE INVENTION

Figure 1:
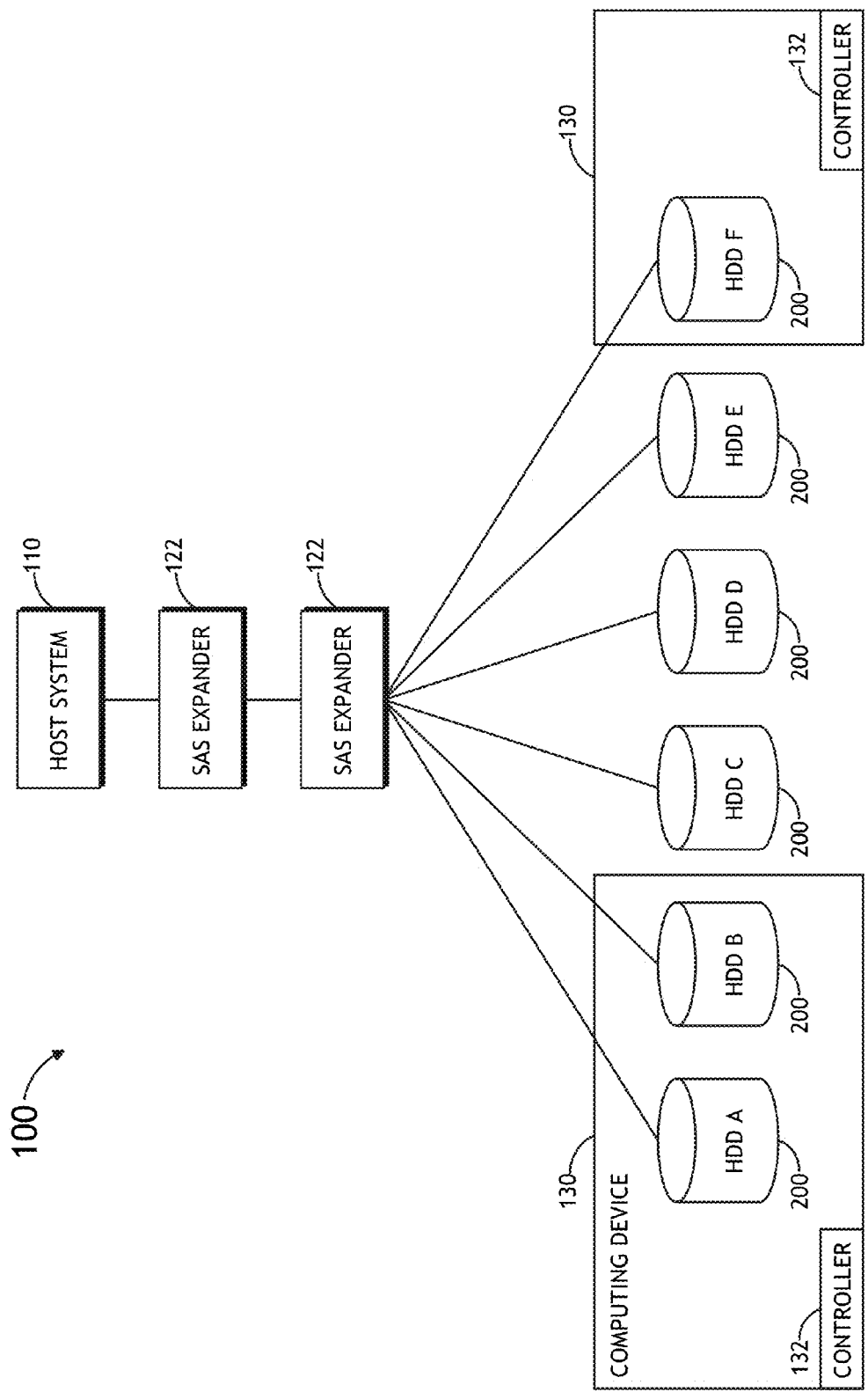
FIG. 1 shows an exemplary communicatively coupled system topology.

Reference will now be made in detail to the subject matter disclosed, which is illustrated in the accompanying drawings. The scope of the invention is limited only by the claims; numerous alternatives, modifications, and equivalents are encompassed. For the purpose of clarity, technical material that is known in the technical fields related to the embodiments has not been described in detail to avoid unnecessarily obscuring the description.

Embodiments of the invention include a method, apparatus, software or firmware, service, at least one circuit, and/or system for performing a flaw scan on a storage device having multiple read sensors (e.g. read heads), such as may be implemented in an array reading magnetic recording (ARMR) architecture or multisensory magnetic recording (MSMR) architecture.

In some embodiments, a hard disk drive may be implemented with multiple heads to read a same track or different tracks to improve read back performance to increase storage density to a higher capacity. Some embodiments, which include multiple sensors/heads, may be configured to increase the throughput of a flaw scan. For example, some embodiments, are configured to use two sensors/heads to read a same track with one analog synthesizer and one timing control loop. Additionally, for example, some embodiments may include multiple read heads, multiple analog synthesizers, and multiple timing loops.

Some embodiments of the invention include two independent timing loops and two clock synthesizers to support independent timing recovery. Some embodiments of the invention are configured to perform a parallel flaw scan on two different tracks, which are either on a same disk plane or different disk planes. Some embodiments are configured to perform flaw scan functions independently. In some embodiments, the flaw scan pattern written to two tracks may be different. In some embodiments, during normal read operation, one of the analog clock synthesizers may be shut down or deactivated such that one clock may be slaved to another clock in order to save power and analog circuit burns. Some embodiments may be configured to perform three or more track flaw scans in implementations with three or more (e.g., three, four, or more) heads and three or more flaw scan circuits, analog front ends (AFEs), and timing loops. Further, some embodiments may be configured to increase user data throughput by simultaneously processing more than one track of user data.

Some embodiments may include a method for performing a parallel flaw scan. The method may include writing intended tracks or disk planes with flaw scan patterns. In some embodiments, the flaw scan patterns can be different from track or plane to track or plane. The method may also include positioning read heads to the intended tracks. For example, in a first implementation where two heads have enough separation, the method may include positioning two heads each in the center of their respective tracks. For example, in a second implementation, the method may include positioning a first head of a multiple sensor system to the center of a first target track on a first plane (e.g. a top or bottom disk plane) and positioning a second head of the multiple sensor system to the center of second target track on another disk plane (e.g., a bottom or top disk plane, a plane of a second disk, or the like); for the exemplary second implementation, some embodiments may include a micro actuator configured to instruct two heads, which are each on a different plane, to follow a servo in two different planes. The method may also include reading signals from the two tracks simultaneously; for each stream of signals, the method may include reading back signals, performing zero phase start (ZPS) and/or zero gain start (ZGS), performing gain/timing loops, etc., and performing flaw scans. The method may additionally include outputting flaw scan results simultaneously to a hard drive controller (HDC). Further, the method may include performing the method on the next two tracks.

Some embodiments of the invention are configured to reduce the total flaw scan time by approximately 50% compared to a one sensor/head system. Referring to FIG. 1, an exemplary communicatively coupled system topology 100 including a host system 110, a plurality of expanders 122 (such as Serial Attached Small Computer System Interface (SAS) expanders, or the like), a plurality of computing devices 130 (such as storage systems), and a plurality of storage devices 200 (e.g., hard disk drives (HDDs) 200, solid state drives, cache storage media, or the like (in various configurations and arrangements)) is depicted. For example, each computing device 130 can include one or more controllers 132 (such as a storage controller, or the like) and one or more storage devices 200 (such as HDDs, solid state drives, cache, or the like), as well as any other computer components (not shown), such as one or more processors, one or more network cards, one or more busses, one or more memories, cache, software, firmware, a power supply, wired or wireless connectivity to other devices, or the like. In some exemplary embodiments, one or more of the computing devices 130 are implemented as a RAID (a redundant array of independent disks or a redundant array of independent storage devices) system, wherein the one or more of the storage devices 200 (e.g., hard disk drives, solid state drives, a cache storage medium, or the like) are implemented in a RAID configuration; in some exemplary embodiments, the controller 132 of the RAID system comprises a RAID-enabled controller.

Figure 2:
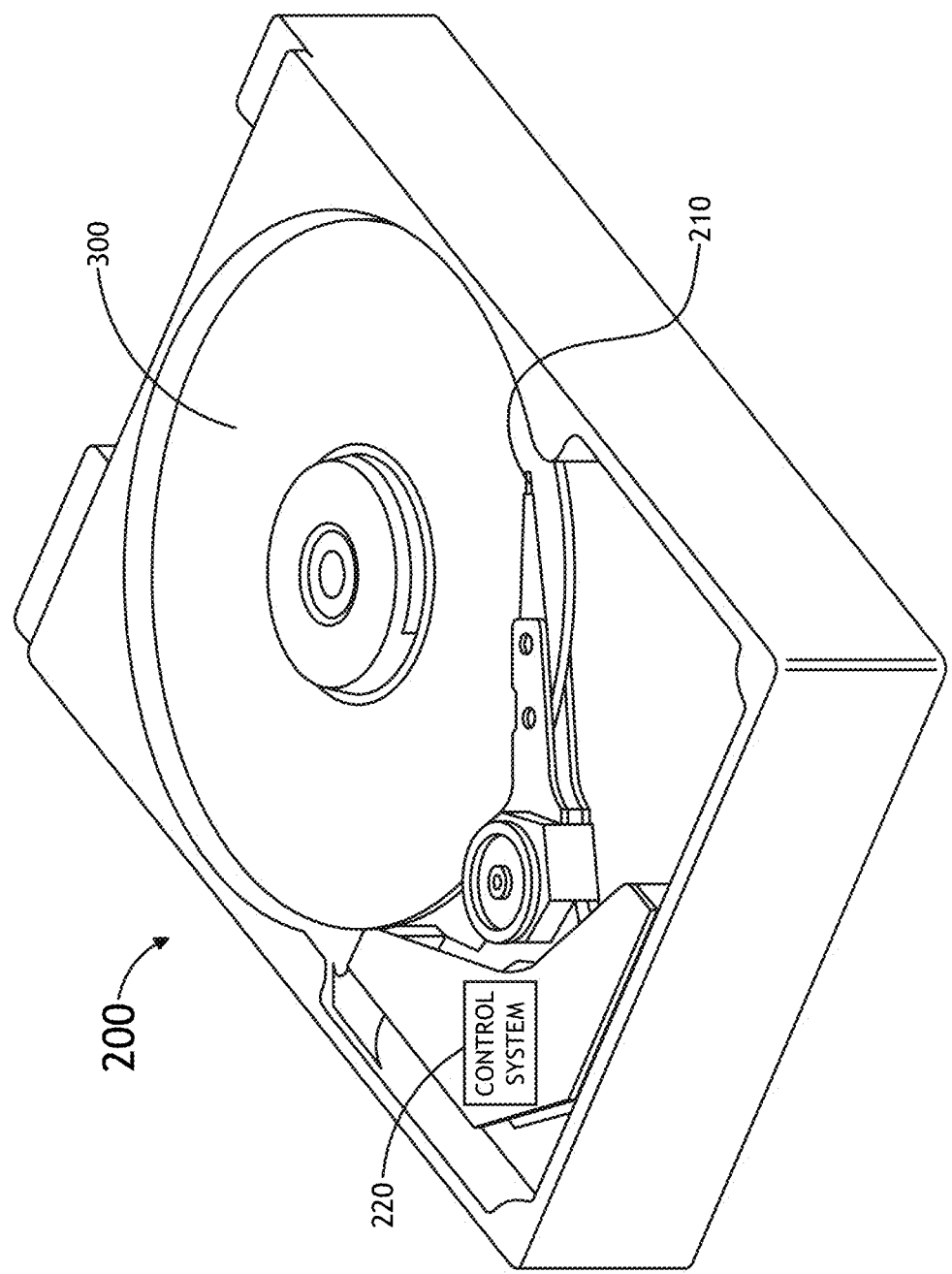
FIG. 2 shows an exemplary storage device.

Referring to FIG. 2, an exemplary hard disk drive 200 suitable for some embodiments of the invention is depicted. The hard disk drive 200 includes one or more platters 300, one or more (e.g., one, two, three, four, or more) read/write heads 210, and a control system 220, as well as other components known to one of ordinary skill in the art. Each of the one or more read/write heads 210 includes one or more magnetic heads configured to read and write raw data streams to a particular platter 300 of the hard disk drive 200. In embodiments of the invention, the control system 220 includes one or more electronic circuits. The one or more electronic circuits can comprise a phase-locked loop circuit (such as a digital phase-locked loop or an all-digital phase-locked loop).

Figure 3:
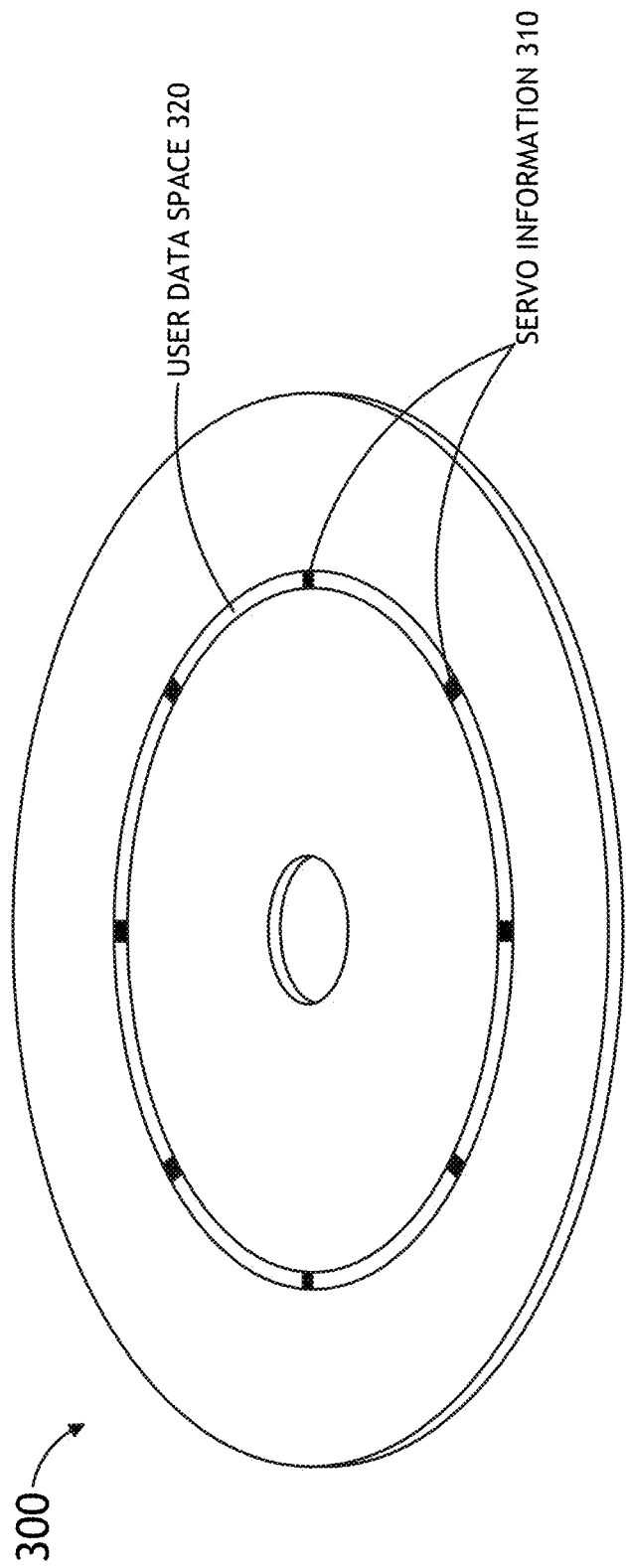
FIG. 3 shows an exemplary platter of a hard disk drive.

Referring to FIG. 3, an exemplary platter 300 of a hard disk drive 200 is depicted. The platter 300 includes a plurality of user data spaces/flaw scan pattern data spaces 320 and a plurality of servo information 310. Each of the plurality of servo information 310 is configured to be read by one or more read/write heads 210. A sync mark is a field that allows for the detection of the first bit of a particular user data space/flaw scan pattern data space. This servo information is used by the control system 220 for the synchronization and timing of read/write events. In some embodiments, each of the servo information 310 may include a preamble, a servo sync mark, and servo track/wedge information data.

While FIGS. 1-3 depict an exemplary embodiment implemented within one or more storage devices 200 (e.g., one or more hard disk drives or components thereof), one of ordinary skill in the art will appreciate that other embodiments may comprise different implementations without departing from the scope or spirit of the disclosure. For example, some embodiments may be applied to, implemented in, and/or implemented as circuits, methods, apparati, systems, and/or computer-executable instructions of or for digital signal processing (DSP), coding, read channels, read-write channels, communication channels, storage systems (such as RAID systems or the like) or the like; furthermore, some embodiments may include one or more virtualized hard disk drives implemented on another storage device (such as a solid state drive) or a virtualized circuit performing a method of some embodiments.

Figure 4:
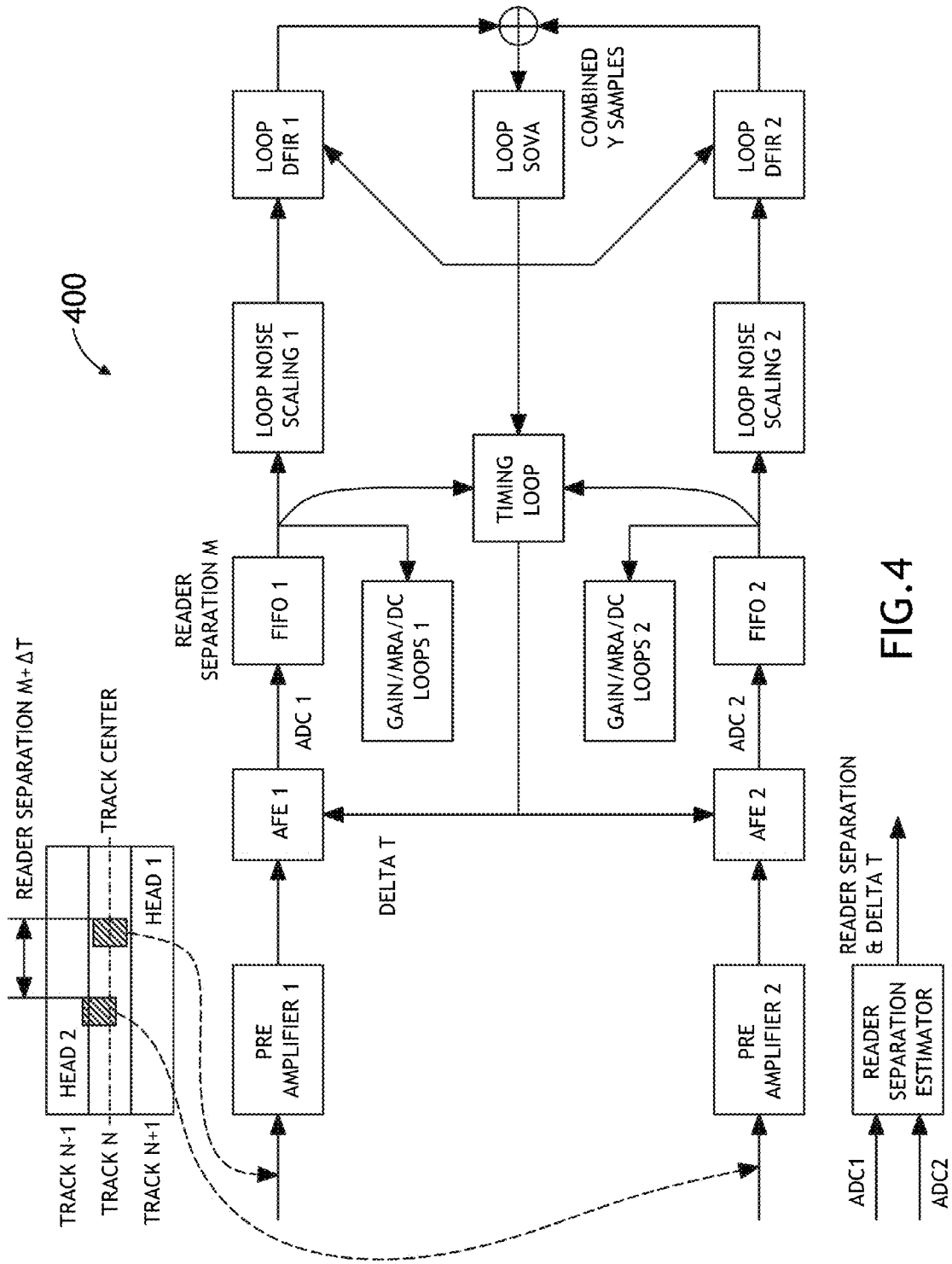
FIG. 4 shows an exemplary read channel system.

Referring now to FIG. 4, an exemplary implementation of a read channel system 400 configured to read a single disk surface is shown. In order to increase the throughput of flaw scan, multiple heads need to be able to do flaw scan at different locations (e.g., different tracks, different disk planes, or different disks). For example, in a multiple sensor/head implementation, one sensor may be configured to read one plane of the disk and the other sensor may be configured to read the other plane of the disk or a different disk. However, the exemplary implementation of the read channel system 400 may not be configured to conduct multiple flaw scans in parallel. Embodiments of the invention overcome the shortcomings of exemplary implementation of the read channel system 400 as exemplarily shown in the read channel system 500 of FIG. 5.

Figure 5:
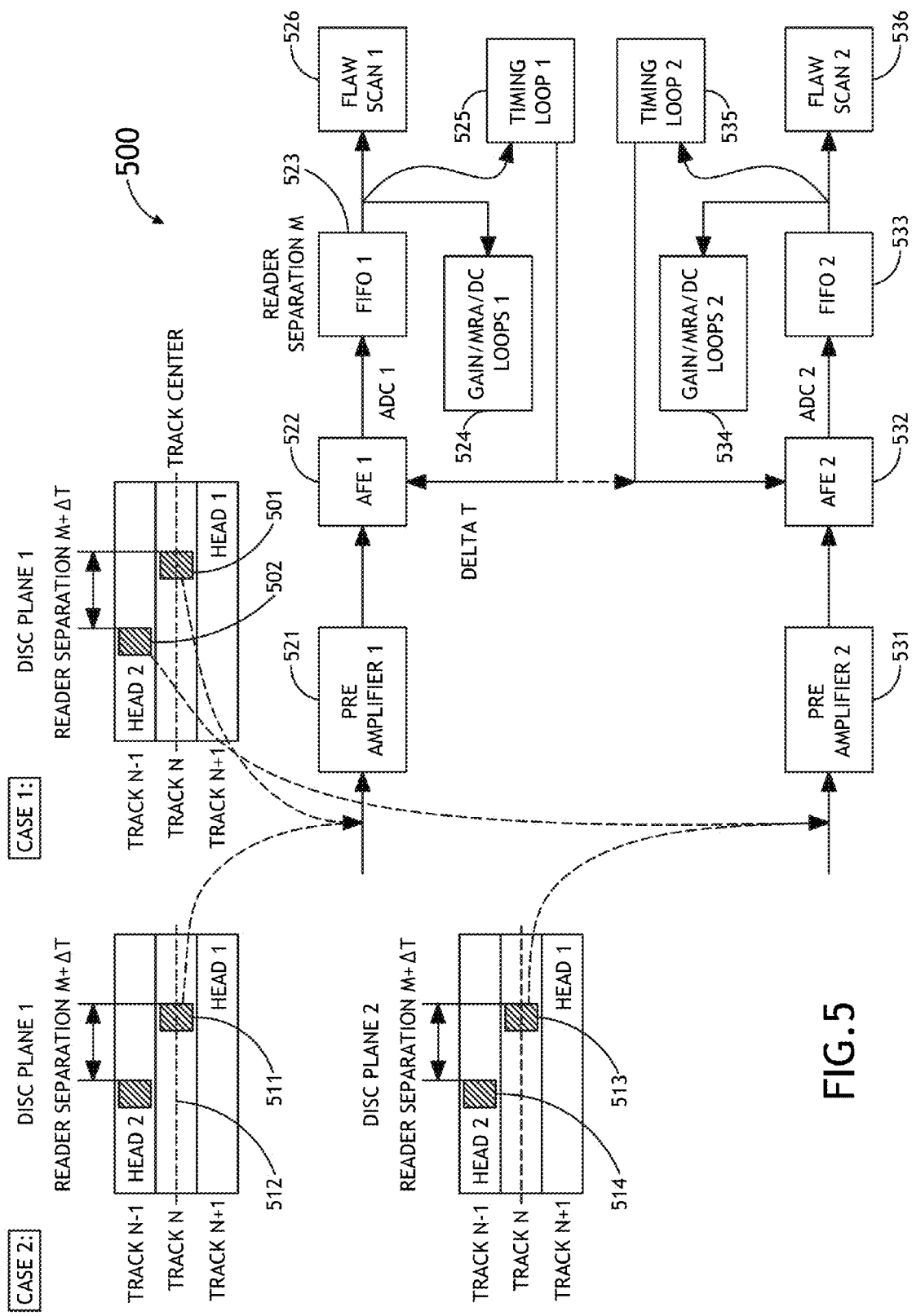
FIG. 5 shows a further exemplary read channel system of some embodiments.

Referring now to FIG. 5, a read channel system 500 is shown. In some embodiments, the read channel system 500 includes two or more parallel read channel circuitry portions each configured to process read-back of user data or flaw scan patterns simultaneously. Each of the two or more parallel read channel circuitry portions, as well as components thereof, may be communicatively coupled. For example, a first read channel circuitry portion may include a first preamplifier 521, a first analog front end (AFE) 522, a first first-in-first-out (FIFO) unit 523, a first gain/magnetic record asymmetry (MRA)/DC loop 524, a first timing loop 525, and a first flaw scan unit 526. Similarly, for example, a second read channel circuitry portion may include a second preamplifier 531, a second analog front end (AFE) 532, a second first-in-first-out (FIFO) unit 533, a second gain/magnetic record asymmetry (MRA)/DC loop 534, a second timing loop 535, and a second flaw scan unit 536.

Referring still to FIG. 5, some embodiments include the read channel system 500 being configured for performing multiple flaw scans in parallel for various configurations of read sensors (e.g., read heads 501, 502, 511, 512, 513, 514) and tracks. In a first exemplary case, which includes reading tracks on the same surface (for example, two adjacent tracks on the same zone), the read channel system 500 may only need one timing loop and one analog clock synthesizer to read and/or write user data/flaw scan patterns at a same data rate to the two tracks. In a second exemplary case, which includes reading two tracks on different surfaces of a plane of a disk, the read channel system 500 may include two independent analog clock synthesizers (e.g., AFE 522, AFE 532) for generating a clock and separate (e.g., two) timing loops (e.g., 525, 535).

Referring still to FIG. 5, the read channel system 500 may be configured to perform parallel, simultaneous flaw scans. The read channel system 500 may include independent timing loops (e.g., 525, 535) to drive independent analog clock synthesizers (e.g., AFE 522, AFE 532). In some embodiments, the read channel system 500 is configured to: 1) read two different tracks in parallel on a same disk plane; and/or 2) read two different tracks in parallel on different disk planes.

Referring still to FIG. 5, the read channel system 500 may be configured to perform a method for performing a parallel flaw scan. The method may include writing intended tracks/disk planes with flaw scan patterns. The flaw scan patterns may be the same or different from track/plane to track/plane. The method may also include positioning read heads to the intended tracks. For example, in a first exemplary case, where two read heads are configured to read the same disk plane and each of the two read heads have enough separation, the method may include positioning each of the two heads in the center of their respective track. Additionally, for example, in a second exemplary case, if the two read heads are configured to read different disk planes, the method may include positioning a first head of the multiple sensor system to the center of a first target track on a first plane, and positioning a second head of the multiple sensor system to the center of a second target track on a second plane. In the second exemplary case, the read channel system 500 may include a micro actuator configured to instruct each of the two heads (which are configured to read different planes) to follow a servo in two different planes.

Additionally, the method may include reading signals from the two tracks simultaneously, and performing zero phase start (ZPS)/zero gain start (ZGS), gain/timing loops, etc., and performing flaw scan for each stream of read back signals. Further, the method may include outputting flaw scan results simultaneously to a controller (e.g., a storage device controller, controller 132, a control system 220, a hard drive controller (HDC), or the like).

Also, the method may be performed as a sequence of iterations such that the method is performed on a next set (e.g., two) of tracks.

In some embodiments, the total time it takes to perform a flaw scan may be reduced by 50% as compared to a one sensor/head system.

In some embodiments, the read channel system 500 includes two or more independent timing loops (e.g., 525, 535) and two or more clock synthesizers (e.g., AFE 522, AFE 532) such that the read channel system 500 is configured to perform independent timing recovery. Additionally, in some embodiments, the read channel system 500 may be configured to conduct parallel flaw scan for two different tracks either for a same disk plane or for different disk planes. Further, in some embodiments, the read channel system 500 includes independent flaw scan function blocks (e.g., 526, 536) to perform flaw scans independently. Additionally, in some embodiments, the flaw scan pattern written to different tracks may be different or the same. Also, in some embodiments, the read channel system 500 may be configured such that during normal read operation, one of the analog clock synthesizers may be deactivated (e.g., shut down), and one clock may be slaved to another clock in order to reduce power and to reduce analog circuit burns. Further, in some embodiments, the read channel system 500 may be implemented in multisensor systems which include more than two (e.g., three, four, or more) heads configured to read more than two tracks and perform more than two flaw scans simultaneously; that is, the read channel system 500 may include more than two scan circuits, more than two AFEs, more than two timing loops, or the like in some embodiments. Additionally, some embodiments may be configured to be applied to performing read back of user data portions to increase the user data throughput by simultaneously processing more than one track of user data.

It should be noted that each of the storage system 100 or storage devices 200 may be implemented as a RAID (redundant array of inexpensive storage devices or redundant array of independent storage devices) based storage system. Additionally, each storage system 200 may be integrated into a larger storage system such as, for example, a RAID (redundant array of inexpensive storage devices or redundant array of independent storage devices) based storage system. Such a RAID storage system increases stability and reliability through redundancy, combining multiple storage devices as a logical unit. Data may be spread across a number of storage devices included in the RAID storage system according to a variety of algorithms and accessed by an operating system as if it were a single storage device. For example, data may be mirrored to multiple storage devices in the RAID storage system, or may be sliced and distributed across multiple storage devices in a number of techniques. If a small number of storage devices in the RAID storage system fail or become unavailable, error correction techniques may be used to recreate the missing data based on the remaining portions of the data from the other storage devices in the RAID storage system. The storage devices in the RAID storage system may be, but are not limited to, individual storage systems such as storage system 200, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

As mentioned previously, the storage device configuration and storage system configuration can be varied in other embodiments of the invention. For example, the storage device 200 may comprise a hybrid HDD which includes a flash memory in addition to one or more storage disks.

In addition, one or more of the storage devices 200 may be coupled to or incorporated within a host processing device, which may be a computer, server, communication device, etc.

Multiple storage devices 200 (some or all possibly comprising various different types) may be incorporated into or implemented as a virtual storage system. The virtual storage system, also referred to as a storage virtualization system, comprises a virtual storage controller coupled to a RAID system, where RAID denotes Redundant Array of Independent storage Devices. In some embodiments, the RAID system more specifically comprises N distinct storage devices, one or more of which may be HDDs and one or more of which may be solid state drives. Furthermore, one or more of the HDDs of the RAID system are assumed to be configured to include read channel circuitry and associated error correction circuitry as disclosed herein. These and other virtual storage systems comprising HDDs or other storage devices are considered embodiments of the invention.

Embodiments of the invention may also be implemented in the form of integrated circuits. In a given such integrated circuit implementation, identical die are typically formed in a repeated pattern on a surface of a semiconductor wafer. Each die includes, for example, at least a portion of signal processing circuitry as described herein, and may further include other structures or circuits. The individual die are cut or diced from the wafer, then packaged as an integrated circuit. One skilled in the art would know how to dice wafers and package die to produce integrated circuits. Integrated circuits so manufactured are considered embodiments of the invention.

It should again be emphasized that the above-described embodiments of the invention are intended to be illustrative only. For example, other embodiments can use different types, quantities, and arrangements of storage disks, read/write heads, read channel circuitry, signal processing circuitry, decoders, filters, detectors, and other storage device elements for implementing the described functionality. Also, the particular manner in which certain steps are performed in the signal processing may vary. Further, although embodiments of the invention have been described with respect to storage disks such as HDDs, embodiments of the invention may be implemented various other devices including optical data-storage applications and wireless communications.

These and numerous other alternative embodiments within the scope of the following claims will be apparent to those skilled in the art.

It is believed that embodiments of the present invention and many of its attendant advantages will be understood by the foregoing description, and it will be apparent that various changes can be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for performing parallel flaw scans of a plurality of tracks of a storage device, the storage device including at least one disk, at least two read sensors, at least two analog front ends, and at least two independent timing loops, wherein each disk includes at least one surface, wherein each surface includes a plurality of tracks, the method comprising:
   writing flaw patterns to tracks of one or more surfaces of one or more disks;
   positioning a first read sensor to read a first track;
   positioning a second read sensor to read a second track;
   simultaneously reading signals from the first track and the second track;
   simultaneously performing flaw scans on read back signals from the first track and the second track; and
   outputting flaw scan results.

2. The method of claim 1, wherein the first track and the second track are located on a same surface of a particular disk, and wherein the first read sensor and the second read sensor are configured to read the same surface of the particular disk.

3. The method of claim 1, wherein the first track and the second track are located on different surfaces of one or more particular disks, and wherein the first read sensor and the second read sensor are configured to read the different surfaces of the one or more particular disks.

4. The method of claim 3, wherein the storage device includes a micro-actuator configured to position the first read sensor and the second read sensor to follow a servo for the different surfaces.

5. The method of claim 1, wherein the storage device comprises a hard disk drive.

6. The method of claim 1, wherein each read sensor comprises a read head.

7. The method of claim 1, wherein the read channel includes at least two analog clock synthesizers.

8. The method of claim 7, wherein during read-back operation, a first analog clock synthesizer is deactivated, and wherein the first analog clock synthesizer is slaved to another analog clock synthesizer.

9. The method of claim 1, wherein the flaw patterns are different.

10. The method of claim 1, wherein the flaw patterns are the same.

11. The method of claim 1, wherein the storage device includes at least four read sensors, at least four analog front ends, and at least four independent timing loops, the method further comprising:
   positioning a third read sensor to read a third track;
   positioning a fourth read sensor to read a fourth track;
   simultaneously reading signals from the first track, second track, the third track, and the fourth track; and
   simultaneously performing flaw scans on read back signals from the first track, second track, the third track, and the fourth track.

12. A storage system, comprising:
   at least one storage device including at least one disk, a read channel, and a storage device controller, wherein each disk includes at least one surface, wherein each surface includes a plurality of tracks, wherein the read channel includes at least two read sensors, at least two analog front ends, and at least two timing loops, wherein the read channel is configured for:
      writing flaw patterns to tracks of one or more surfaces of one or more disks;
      positioning a first read sensor to read a first track;
      positioning a second read sensor to read a second track;
      simultaneously reading signals from the first track and the second track;
      simultaneously performing flaw scans on read back signals from the first track and the second track; and
      outputting flaw scan results to the storage device controller.

13. The system of claim 12, wherein the first track and the second track are located on a same surface of a particular disk, and wherein the first read sensor and the second read sensor are configured to read the same surface of the particular disk.

14. The system of claim 12, wherein the first track and the second track are located on different surfaces of one or more particular disks, and wherein the first read sensor and the second read sensor are configured to read the different surfaces of the one or more particular disks.

15. The system of claim 14, wherein the at least one storage device includes a micro-actuator configured to position the first read sensor and the second read sensor to follow a servo for the different surfaces.

16. The system of claim 12, wherein the at least one storage device comprises a hard disk drive.

17. The system of claim 12, wherein each read sensor comprises a read head.

18. The system of claim 12, wherein the read channel includes at least two clock synthesizers.

19. The system of claim 12, wherein the flaw patterns are different.

20. A circuit, comprising:
   a read channel of a storage device, wherein the storage device includes at least one disk, wherein each disk includes at least one surface, wherein each surface includes a plurality of tracks, wherein the read channel includes at least two read sensors, at least two analog front ends, and at least two independent timing loops, wherein the read channel is configured for:
      writing flaw patterns to tracks of one or more surfaces of one or more disks;
      positioning a first read sensor to read a first track;
      positioning a second read sensor to read a second track;
      simultaneously reading signals from the first track and the second track;
      simultaneously performing flaw scans on read back signals from the first track and the second track; and
      outputting flaw scan results to a controller.

* * * * *